United States Patent
Hastings, III et al.

(10) Patent No.: US 8,861,625 B2
(45) Date of Patent: Oct. 14, 2014

(54) SIDEBAND MITIGATION COMMUNICATION SYSTEMS AND METHODS FOR INCREASING COMMUNICATION SPEEDS, SPECTRAL EFFICIENCY AND ENABLING OTHER BENEFITS

(71) Applicants: William A. Hastings, III, Las Vegas, NV (US); James Horn, Las Vegas, NV (US)

(72) Inventors: William A. Hastings, III, Las Vegas, NV (US); James Horn, Las Vegas, NV (US)

(73) Assignee: Falcon Nano, Inc., North Las Vegas, NV (US)

( * ) Notice: Subject to any disclaimer, the term of this patent is extended or adjusted under 35 U.S.C. 154(b) by 0 days.

(21) Appl. No.: 13/754,849

(22) Filed: Jan. 30, 2013

(65) Prior Publication Data

US 2013/0142281 A1    Jun. 6, 2013

Related U.S. Application Data

(60) Division of application No. 12/839,300, filed on Jul. 19, 2010, now Pat. No. 8,437,414, which is a continuation of application No. PCT/US2008/087812, filed on Dec. 19, 2008.

(60) Provisional application No. 61/015,043, filed on Dec. 19, 2007.

(51) Int. Cl.
*H04K 1/10* (2006.01)
*H04B 13/02* (2006.01)
*H04B 1/62* (2006.01)

(52) U.S. Cl.
CPC . *H04B 1/62* (2013.01); *H04B 13/02* (2013.01)

USPC .......................... 375/260; 375/295; 375/130

(58) Field of Classification Search
CPC ........................................................ H04B 1/62
USPC ......................................... 375/260, 295, 130
See application file for complete search history.

(56) References Cited

U.S. PATENT DOCUMENTS

| | | | | |
|---|---|---|---|---|
| 4,019,140 A | * | 4/1977 | Swerdlow | .................... 455/63.1 |
| 4,170,764 A | * | 10/1979 | Salz et al. | ..................... 332/100 |
| 4,445,118 A | | 4/1984 | Taylor et al. | |
| 5,206,933 A | | 4/1993 | Farrell et al. | |
| 5,280,472 A | | 1/1994 | Gilhousen et al. | |

(Continued)

FOREIGN PATENT DOCUMENTS

| | | |
|---|---|---|
| JP | 10135826 | 5/1998 |
| WO | WO2009/086185 | 7/2009 |

OTHER PUBLICATIONS

PCT Search Report mailed on May 11, 2009 corresponding to the related PCT Patent Application No. PCT/US2008/087812.

(Continued)

*Primary Examiner* — Juan A Torres

(74) *Attorney, Agent, or Firm* — DLA Piper LLP (US)

(57) ABSTRACT

Common wave and sideband mitigation communication systems and methods are provided that can be used with both wireless and wired communication links. The systems and methods provided can enable faster data rates, greater immunity to noise, increased bandwidth/spectrum efficiency and/or other benefits. Applications include but are not limited to: cell phones, smartphones (e.g., iPhone, BlackBerry, etc.), wireless Internet, local area networks (e.g., WiFi type applications), wide area networks (e.g., WiMAX type applications), personal digital assistants, computers, Internet service providers and communications satellites.

14 Claims, 20 Drawing Sheets

(56) References Cited

U.S. PATENT DOCUMENTS

| | | |
|---|---|---|
| 5,936,999 A | 8/1999 | Keskitalo |
| 6,064,336 A | 5/2000 | Krasner |
| 6,157,619 A | 12/2000 | Ozluturk et al. |
| 6,424,074 B2 * | 7/2002 | Nguyen ................. 310/309 |
| 6,449,266 B1 | 9/2002 | Hottinen et al. |
| 6,466,168 B1 | 10/2002 | McEwan |
| 6,587,515 B1 | 7/2003 | Jafarkhani et al. |
| 6,594,508 B1 | 7/2003 | Ketonen |
| 6,618,429 B2 | 9/2003 | Gilhousen et al. |
| 6,643,518 B1 | 11/2003 | Weckstrom |
| 6,658,045 B1 | 12/2003 | Jin |
| 6,724,842 B1 | 4/2004 | Hochwald et al. |
| 6,801,516 B1 | 10/2004 | Lomp et al. |
| 6,885,652 B1 | 4/2005 | Ozukturk et al. |
| 6,891,897 B1 | 5/2005 | Bevan et al. |
| 6,975,666 B2 | 12/2005 | Affes et al. |
| 7,003,021 B2 | 2/2006 | Gilhousen et al. |
| 7,050,405 B2 | 5/2006 | Attar et al. |
| 7,092,717 B2 | 8/2006 | Au et al. |
| 7,139,274 B2 | 11/2006 | Attar et al. |
| 7,170,954 B2 | 1/2007 | Hassibi et al. |
| 7,245,650 B2 | 7/2007 | Kuroyanagi et al. |
| 7,269,205 B2 | 9/2007 | Wang |
| 2002/0196839 A1 * | 12/2002 | Hunton ..................... 375/130 |
| 2003/0174676 A1 | 9/2003 | Willenegger et al. |
| 2003/0232607 A1 * | 12/2003 | Le Bars et al. ............. 455/126 |
| 2004/0184777 A1 | 9/2004 | Moon |
| 2005/0163199 A1 | 7/2005 | Wang |
| 2006/0083332 A1 | 4/2006 | Dolmans et al. |
| 2006/0094357 A1 | 5/2006 | McCorkle |
| 2006/0280263 A1 | 12/2006 | Yang |
| 2007/0115160 A1 | 5/2007 | Kleveland et al. |
| 2008/0143562 A1 * | 6/2008 | Huang et al. ............... 341/118 |
| 2008/0175331 A1 * | 7/2008 | Kroeger ..................... 375/261 |

OTHER PUBLICATIONS

Wolniansky, Foschini, Golden, Valenzuela, Bell Laboratories, Lucent Technologies, Crawford Hill Laboratory, "V-Blast: An architecture for realizing very high data rates over the rich-scattering wireless channel," Signals, Systems, and Electronics, 1998. ISSSE 98. 1998 URSI International Symposium on, Date of Conference: Sep. 29-Oct. 2, 1998.

* cited by examiner

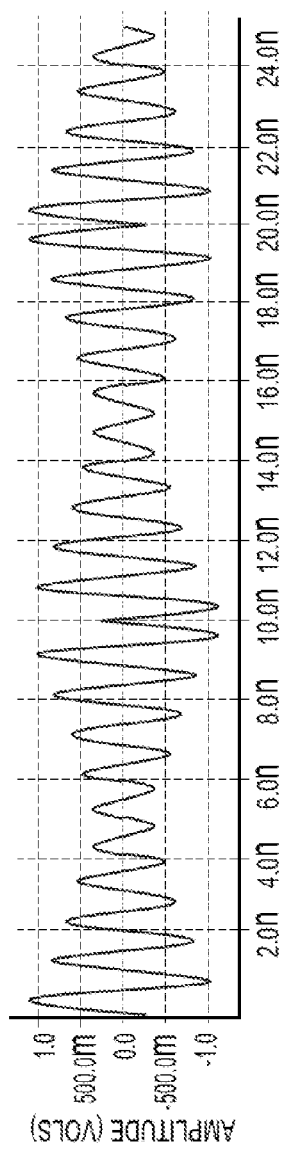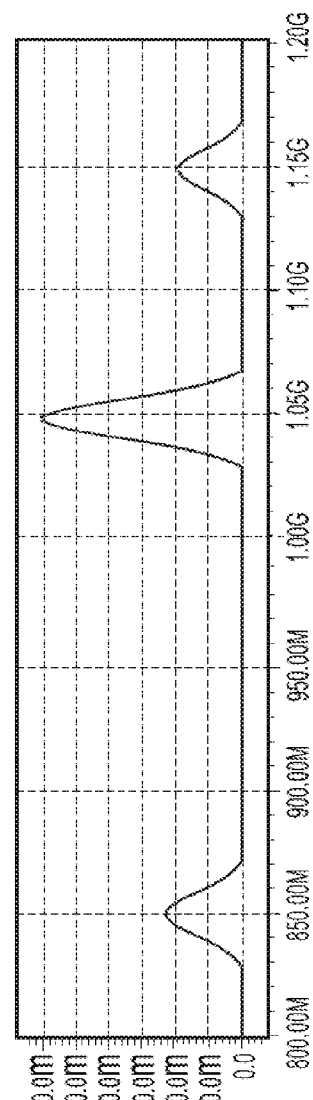

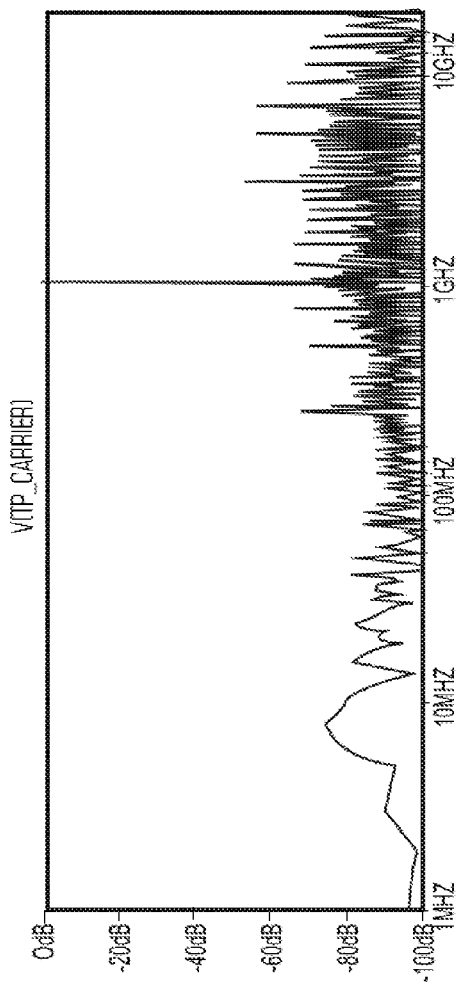
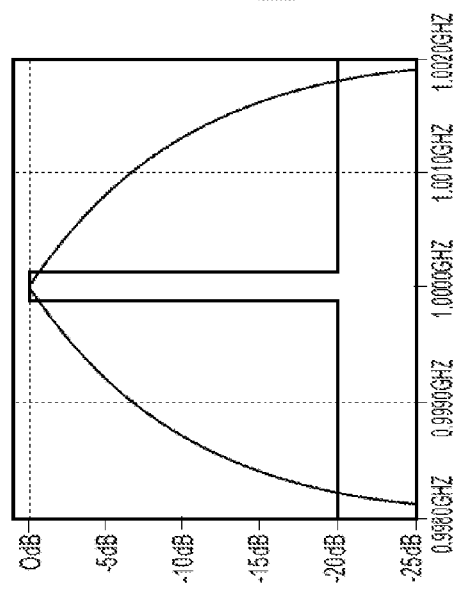
FIGURE 17
FIGURE 18

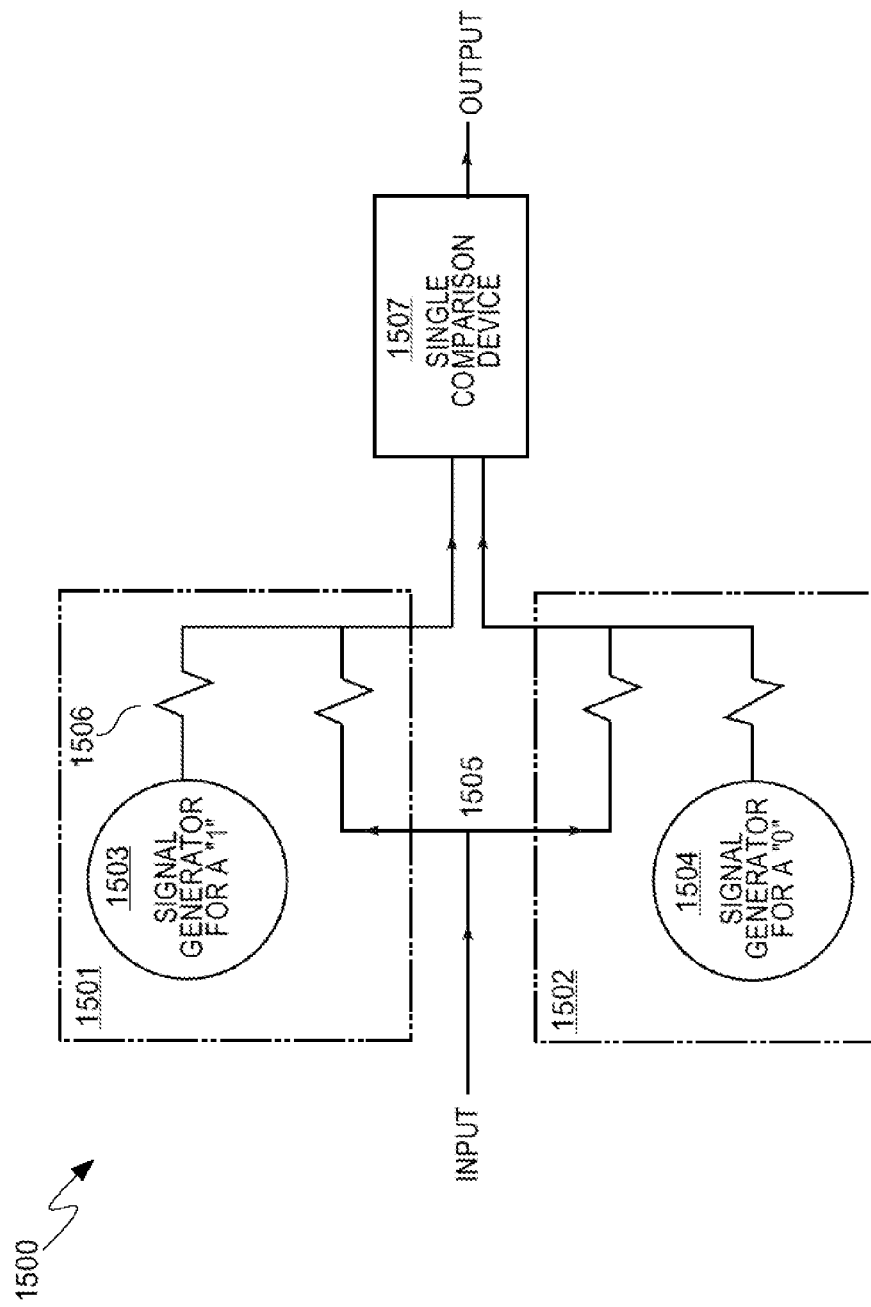

SIDEBAND MITIGATION COMMUNICATION SYSTEMS AND METHODS FOR INCREASING COMMUNICATION SPEEDS, SPECTRAL EFFICIENCY AND ENABLING OTHER BENEFITS

PRIORITY CLAIM/RELATED APPLICATION

This application is a divisional of and claims priority under 35 USC §§120 and 121 to U.S. Provisional Patent Application Ser. No. 12/839,300, filed on Jul. 19, 2010 and entitled "Common Wave And Sideband Mitigation Communication Systems And Methods For Increasing Communication Speeds, Spectral Efficiency And Enabling Other Benefits" which in turns claims the benefit and priority under 35 USC 119 and 120 to PCT Application Serial No. US2008/087812, filed on Dec. 19, 2008 and entitled "Common Wave And Sideband Mitigation Communication Systems And Methods . . . Other Benefits" which in turn claims the benefit under 35 USC 119(e) and priority to under 35 USC 120 of U.S. Provisional Patent Application Ser. No. 61/015,043 filed on Dec. 19, 2007 and entitled "Common Wave Communication System and Method for Increasing Communication Speeds and/or Enabling Other Benefits", the entirety of which is incorporated herein by reference.

FIELD

A wired or wireless communication system and method are provided.

BACKGROUND

Various wired and wireless communication systems are well known. For example, as shown in FIGS. 1 and 2, two different conventional communication systems are known. As shown in FIG. 1, one example of a conventional wired communication system has a transmitter and receiver wherein a data signal is communicated over a first wired communications link and a second data signal (which is an inverted form of the data signal) is communicated over a second wired communications link. In the system shown in FIG. 1, the two wired communications links are nearby each other. The receiver may receive these two data signals and then take the difference between the two data signals in order to extract the data from the data signal. This conventional communication system is known as a differential signal system that allows lower voltages to be used since only the difference between the two signals is needed, allows higher data transmission speeds and increases noise immunity since any noise would affect both the communication links and the noise would be filtered out when the difference between the two data signals is determined. The system shown in FIG. 1 may be used, for example, on a printed circuit board in which each wired communication link is a trace on the printed circuit board.

An example of how the system in FIG. 1 works on copper wires is that the two adjacent wires each have a signal in which one is the inverse of the other. For example, if a "digital 1" is to be transmitted with 1 volt levels, Line A will be at 1 volt and Line B will be at 0 volt (i.e., the inverse) while a "digital 0" is transmitted with Line A at 0 volts and Line B at 1 volt. As the wires run from the transmitter to the receiver, the wires might both pickup noise which will cause the voltage levels in the lines to be raised or lower in addition to causing spikes which can appear to be data. If the 2 wires are in very close physical proximity to each other, the noise will be identical in both wires. At the receiver end, the 2 lines will be connected to a differential amplifier circuit. This differential amplifier circuit will "subtract out" the noise.

FIG. 2 illustrates an example of another conventional communication system that may be a wireless communication system. In this communication system, a transmitter may generate and communicate a plurality of data signals over a communication link and then the receiver extracts data from each data signal independently, but there is no relationship between the data signals that aids in the extraction of the data from the data signals. The system shown in FIG. 2 may be used for a typical mobile phone system such as a time division multiplex or a code division multiplex communication system.

FIG. 3 illustrates a wireless communications system that uses a pilot signal wherein the pilot signal is modulated with the carrier wave and data signal to generate a single output signal that is then sent over a communications link to a receiver. The receiver then uses the pilot signal (embedded in the output signal) to decode the data signal. In this conventional system with a pilot signal, only a single signal is sent over the communications link.

None of these conventional communication systems use a data signal and a reference signal (transmitted over the same communications link but on different channels) and thus it is desirable to provide a common wave system and method and it is to this end that the system and method are directed.

In addition, it is desirable to provide systems and methods for minimizing effective bandwidth and neutralizing sidebands (sideband mitigation) that enable substantial increases in data transmission speed and spectral efficiency and it is to this end that the system and method are also directed.

BRIEF DESCRIPTION OF THE DRAWINGS

FIGS. 13 and 14 illustrate an example of a method for neutralizing sidebands of a communication system;

FIG. 17 illustrates an example of a FFT of the 1 GHz unmodulated signal for 1000 ns;

FIG. 18 illustrates an example of a FFT for 1 GHz unmodulated signal for 1000 ns sample with 250 kHz-20 dB mask;

FIG. 32 illustrates an example of a circuit for phase filtering.

DETAILED DESCRIPTION OF ONE OR MORE EMBODIMENTS

The system and method are particularly applicable to a wireless communication system with a single communications link using a discrete hardware circuit based transmitter and receiver as described below and it is in this context that the system and method will be described. It will be appreciated, however, that the system and method has greater utility since the system and method may be used with wired (for example, a fiber optic, wires, a printed circuit board (PCB) trace, etc.) or wireless communication systems (for example, cellular phone systems, mobile device wireless systems, etc.), may be implemented as a transmitter or a receiver only, and/or may be implemented in software (soft transmitter and/or receiver), hardware (as shown below or other implementations) or a combination of software and hardware (for example a digital signal processor with firmware or other implementations).

In the context of this disclosure, "mobile device" may include any mobile wireless communications device including but not limited to: a cellular phone, Personal Communications Service PCS, smartphone (e.g., iPhone, BlackBerry, etc.), wireless internet cards or circuits for computers, wireless local and wide area network (e.g., WiFi, WiMax, etc.) cards or circuits, satellite phones, GPS tracking devices, etc. The device using the common wave system and method is mobile device regardless of the type of data the device is transmitting or receiving. For example, the data being transmitted or received may include any type of information including but not limited to voice, data files, video, broadcasts, music, telemetry, radio, etc.

Figure 1:
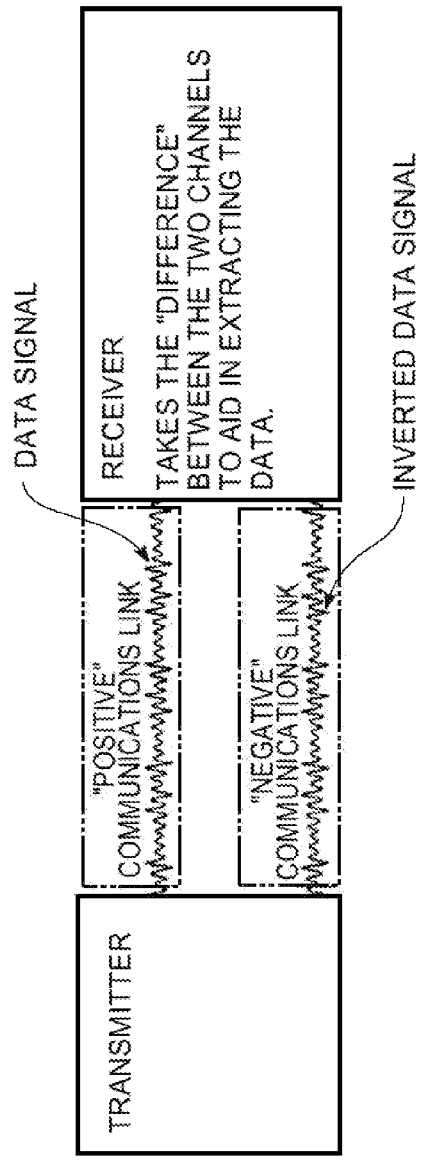
FIGS. 1 and 2 illustrate conventional communication systems.
Figure 2:
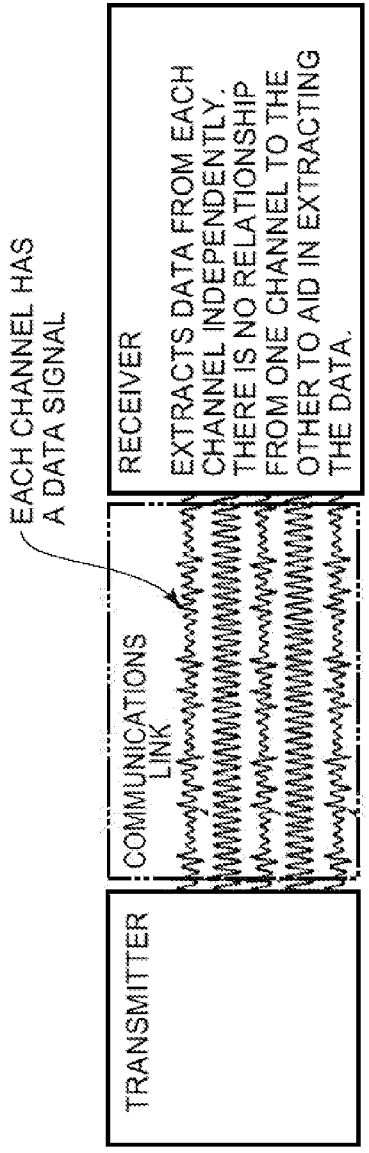
Figure 3:
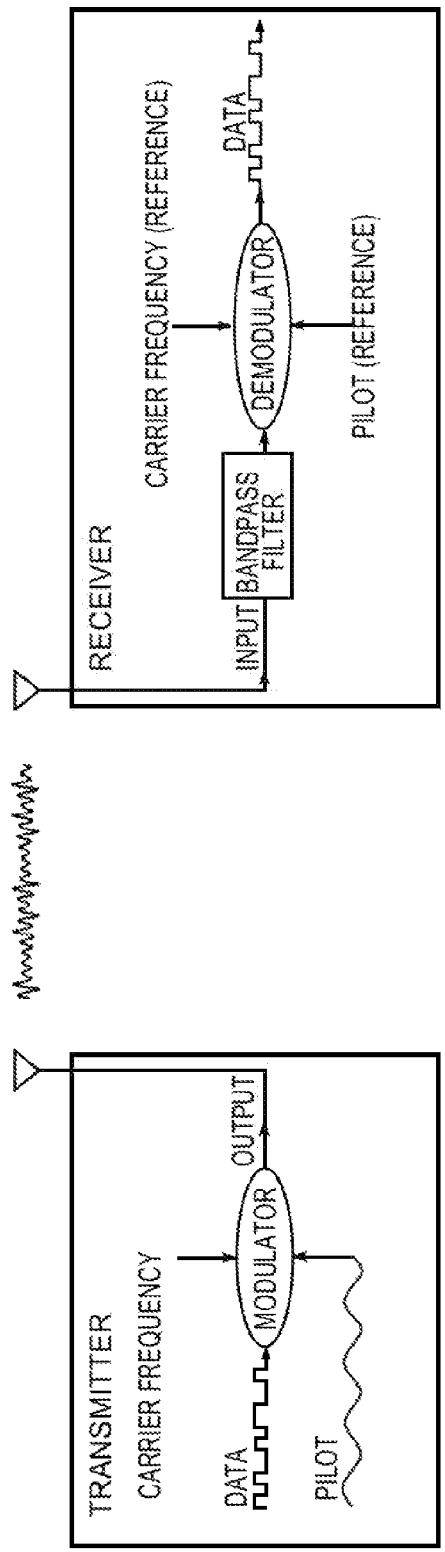
FIG. 3 illustrates a conventional pilot signal communication system.
Figure 4:
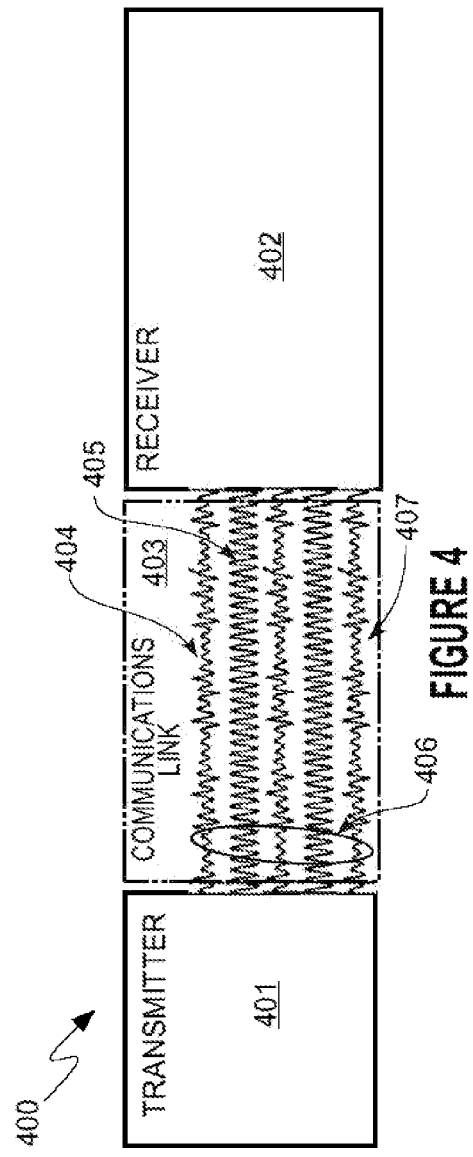
FIG. 4 illustrates an implementation of a common wave communication system having a transmitter and receiver.

FIG. 4 illustrates an implementation of a common wave communication system 400 having a transmitter 401 and a receiver 402. The communication system 400 may also include a communication link 403 that may be a medium over which a signal can be transmitted between the transmitter and the receiver. The medium may include the atmosphere, space, water, wire, coaxial cable, fiber optics, printed circuit board traces, integrated circuit traces, drilling mud, AC power distribution lines, etc. In the communication system, there may be a plurality of channels 406 in the communication link 403. The communication system may include at least one data channel 404 that contains a data signal, at least one reference channel 405 that contains a reference signal and one or more other channels 407 that can contain data or reference signals. The communication link for the at least one data channel and the communication link for the at least one reference channel may be the same communication link or may be different communication links.

In the common wave system, the data signal may be known as a data wave which has an information signal modulated onto a carrier wave using various modulation techniques, such as for example frequency modulation, amplitude modulation, phase modulation, or a combination thereof, etc. The reference signal may be known as a common wave that may be a known frequency signal (that may be fixed or adjustable in a known manner) that acts as a reference wave to the data wave. In one embodiment, the data wave and the common wave may be at different frequencies but the different frequencies are close to each other. In one embodiment, such as code division multiple access (CDMA) mobile phone system that employs frequency hopping, although the data wave and the common wave are at different frequencies at any one instant in time, the data wave may be at the same frequency as the common wave was at some other instant in time due to the frequency hopping. In another embodiment, the common wave signal may be transmitted for a predetermined number of cycles at a particular frequency and then the data wave signal may be transmitted for a predetermined number of cycles (different from the predetermined number of cycles during which the common wave signal is transmitted) at the same frequency or at a different frequency. In another embodiment, the data wave signal and the common wave signal may be at the same frequency wherein a series of common wave signals are transmitted and then a series of data wave signals are transmitted (or a series of data wave signals are transmitted and then a series of common wave signals are transmitted) wherein the common wave signals can be used to calibrate the receiver and provide some noise filtering for the data wave signals.

In one embodiment of the common wave system, the one or more data signals 404 and the one or more reference signals 405 are simultaneously communicated over the communications link 403 and received by the receiver 402. In other embodiments, the one or more data signals and the one or more reference signals are not simultaneously communicated over the communications link. When the one or more data signals and the one or more reference signals are received by the receiver 402, each data signal is compared to a corresponding reference signal in order to extract an information signal from the data signal. The common wave system provides increased noise immunity because the data signals and the corresponding reference signal will both be affected in a similar manner by noise in the communication link 403 so that the comparison of the data signal to the reference signal in the receiver filters out a portion of the noise, reduces the noise level in the data signal which results in a better signal to noise ratio and thus a higher possible transmission rate as is well known due to Shannon's Law.

Figure 5:
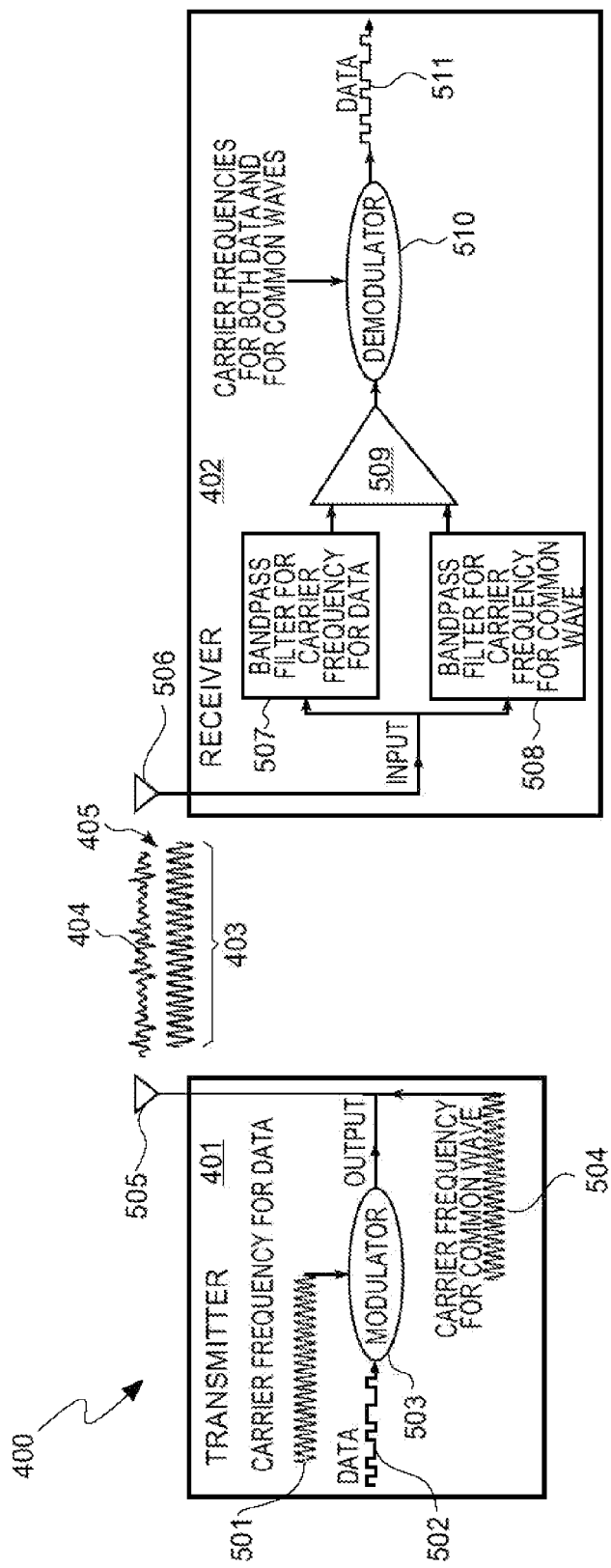
FIG. 5 illustrates more details of an example of the common wave communication system shown in FIG. 4.

FIG. 5 illustrates more details of an example of the common wave communication system 400 shown in FIG. 4 in which a single data signal channel and a single reference signal channel are shown being communicated over a wireless communication link for illustration purposes. As above, the data signal 404 and the reference signal 405 are communicated over the communications link 403 between the transmitter 401 and the receiver 402. The transmitter 401 may have a modulator 503 that modulates an information signal 502 onto a carrier wave 501 (with a specific frequency) to generate the data signal. In one embodiment, a phase modulator circuit may be used. A common wave signal 405 is generated, but is not (in the example shown in FIG. 5) modulated before it is transmitted. The data signal and the common wave signal are then transmitted via one or more antennas 505 over the communication link 403 to the receiver 402.

The receiver 402 may receive the signals from the communication link using one or more antennas 506 wherein the signals received by the antennas 506 that input into a first filter 507 and a second filter 508 wherein the first filter is tuned to the frequency of the carrier wave of the data signal and the second filter is tuned to the frequency of the reference signal. Thus, the first filter allows the data signal to be output (and filters out other signals) to a first input of a signal comparison device 509 while the second filter allows the reference signals to be output (and filters out other signals) to a second input of the signal comparison device 509. In one embodiment, the signal comparison device may be a differential amplifier that compares the signals at the first and second inputs. Thus, the signal comparison device 509 outputs a signal that is the difference between the data signal and the reference signal, which removes noise introduced in the communication link 403. The output of the signal comparison device is fed into a demodulator 510 (such as a phase demodulator in the example in FIG. 5) that also receives a replica of the carrier wave (generated locally in the receiver or extracted from the transmitted signals) in order to generate an information signal 511 that corresponds to the information signal 502 input to the transmitter 401. In one embodiment using a differential amplifier, the output of the differential amplifier can then be analyzed to identify the data (demodulated). While this signal will be significantly different than normal wireless signals to be demodulated, it can be analyzed with well-known techniques using standard circuitry or digital signal processors (DSP).

Figure 6:
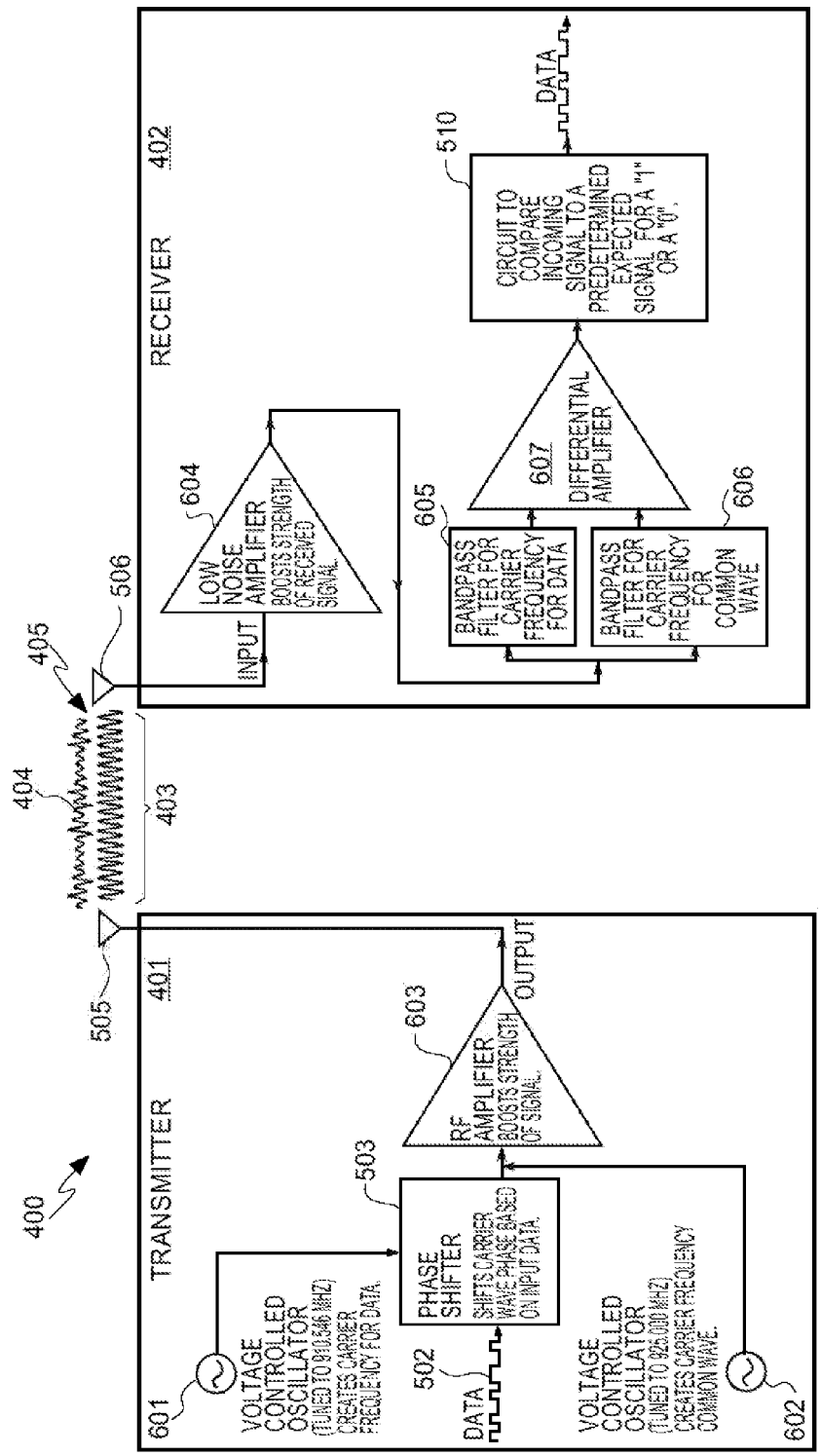
FIG. 6 illustrates an example of an implementation of the common wave communication system shown in FIG. 4.
Figure 7:
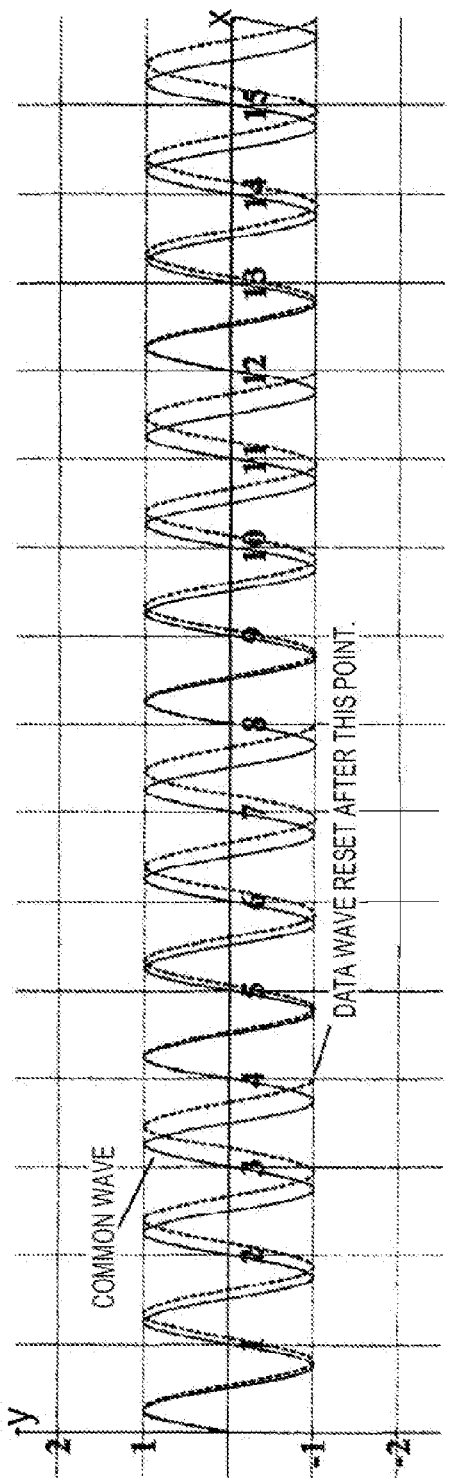
FIG. 7 illustrates an example of expected signals for a demodulator circuit in a common wave communications system receiver to compare to the input signal.

FIG. 6 illustrates an example of an implementation of the common wave communication system shown in FIG. 4. In this implementation, the transmitter 401 may further comprise a carrier wave generator 601, such as for example a voltage controller oscillator, that generates the carrier wave such as a carrier wave at 910.546 MHz and a reference wave generator 602, such as for example a voltage controller oscillator, that generates the reference wave such as a reference wave at 925.000 MHz. In this implementation, the modulator 503 may be a phase shifter circuit that shifts the carrier wave phase based on the information signal 502. In this implementation, the data signal and the reference wave are input into a signal amplifier 603, such as a radio frequency amplifier, that boosts the strength of both signals before they are radiated by the one or more antennas 505.

The receiver 402 in this implementation may further include an amplifier 604, such as a low noise amplifier, that boosts the signal strength of the received signals (both the data signal and the reference signal), which are then fed into the filters 605, 606 whose outputs are then fed into a differential amplifier 607 whose output is fed into the demodulator 510. In this implementation, the demodulator 510 may be a circuit (such as a thresholding circuit) that compares the incoming information signal (output from the signal comparison device differential amplifier 607) to an expected signal for a "1" or a "0" and outputs the recovered information signal. The expected signals for a "1" and a "0" for one embodiment in which the "1" starts positive 90 degrees out of phase with the data wave and the "0" starts negative 90 degrees out of phase with the data wave.

Figure 8:
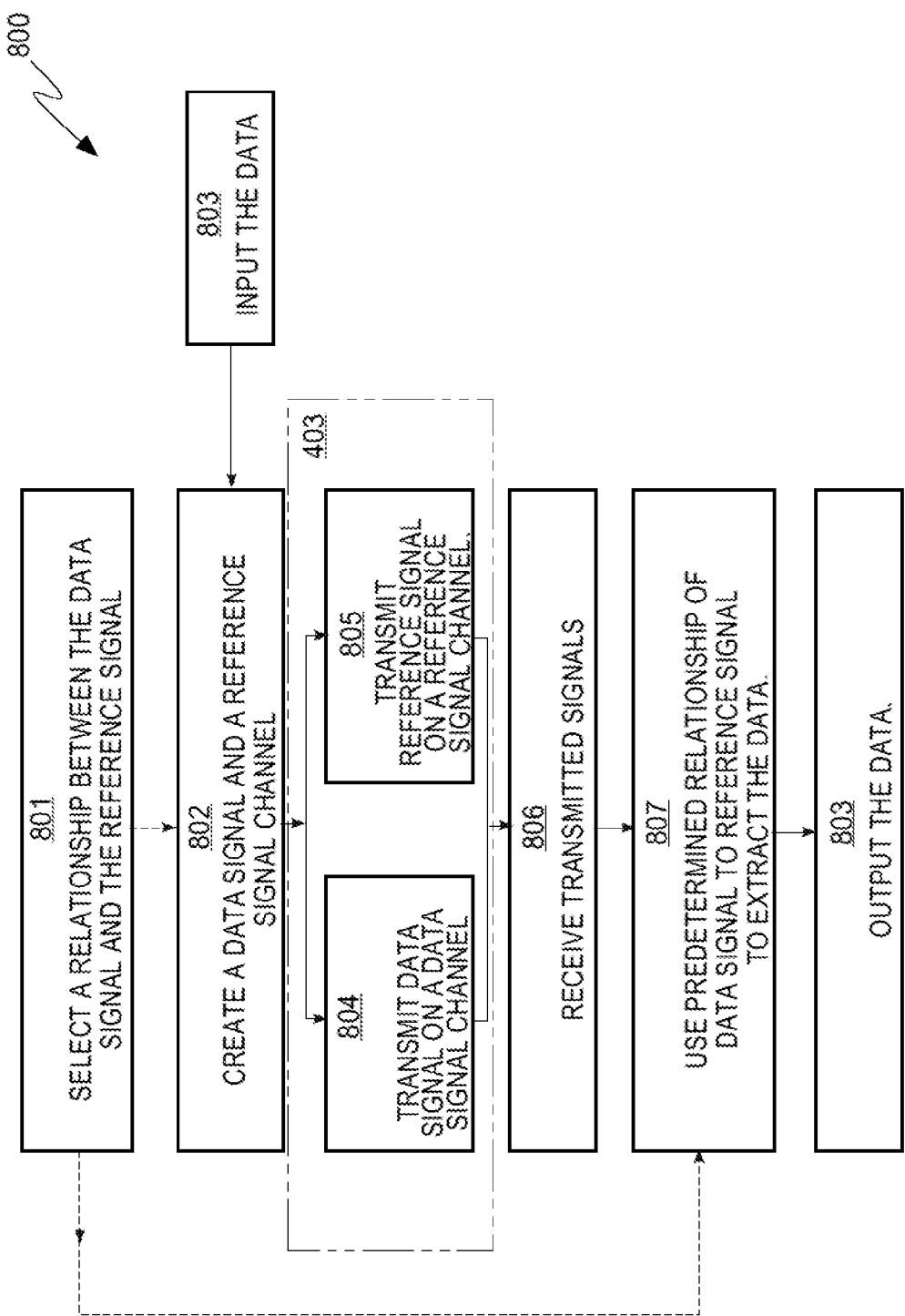
FIG. 8 illustrates an example of a method for common wave communication.

FIG. 8 illustrates an example of a method 800 for common wave communication that may be carried out by the transmitter and receiver shown in FIGS. 4-6 above. At the transmitter, the system selects a relationship between the data signal and the reference signal (801) which may be communicated to the receiver in some fashion (e.g., the relationship may be pre-configured or set during each communication session). The relation ship may be specific differences in amplitudes, frequencies, phases and/or polarities at specific points in time. In one embodiment, the system can have a default setting (set at both the transmitter and receiver) and then can adjust the relationship as needed by communicating with each other. An example of the default relationship may be a typical amplitude, frequency and/or phase modulation and the changing of the relationship during the communications may be done to provide frequency hopping and/or adjusting signal strength. Once the relationship is determined, the transmitter may create a reference signal and a data signal (802) based on an information signal (803). Once the signals are generated in the transmitter, the data signal is communicated over a data signal channel (804) and the reference signal is communicated over a reference signal channel (805) over one or more communications link(s) 403. The receiver then receives the transmitter signals (806) and then uses the relationship information to extract the information signal from the data signal in the data channel (807) so that the information signal is outputted (808).

Figure 9:
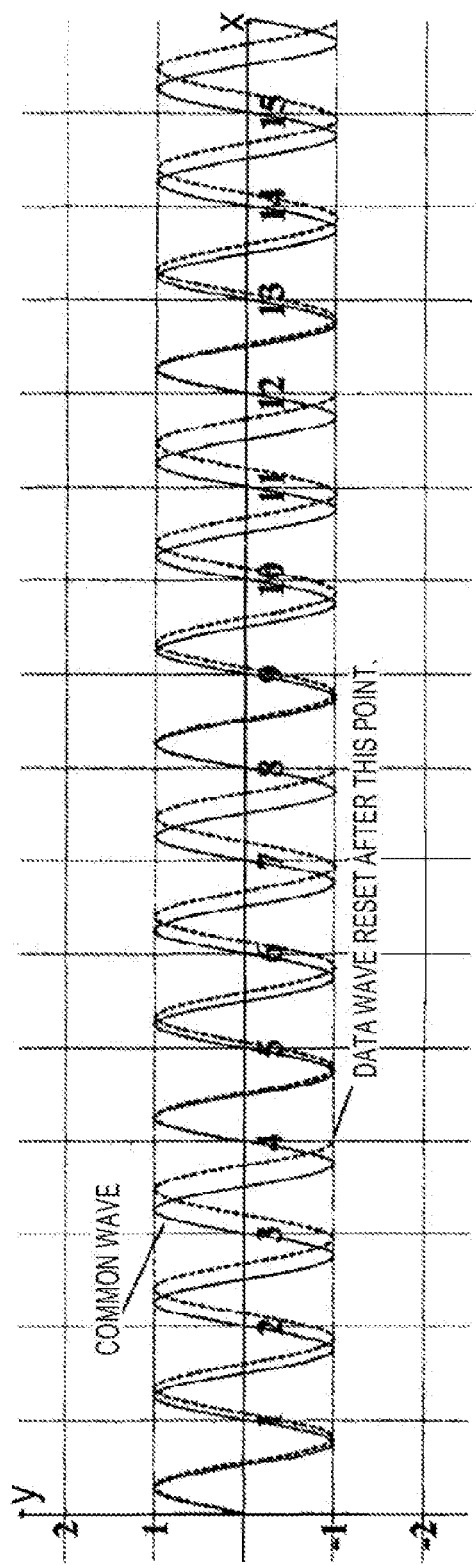
FIG. 9 illustrates an example of a method for resetting a data signal of the common wave communication system.

FIG. 9 illustrates an example of a method for resetting a data signal of the common wave communication system. When the reference signal and the data signal are simultaneously transmitted, the two signals become superimposed which may cause significant destructive interference for much of the time (about 50% of the time) which is common to many wireless systems. To overcome this superimposition issue, in one embodiment of the common wave communication system using phase modulation, the transmitter may periodically reset the data signal to bring it back into phase with the data signal as shown in FIG. 9. In one embodiment, the data wave may be reset every 4 signal periods (such as shown in FIG. 9). In addition to the phase modulation embodiment, the resetting of the data signal may also be used for amplitude modulation embodiments, frequency modulation embodiments and other modulation embodiments. In addition to the common wave communication system with the data signal and reference signal simultaneously transmitted, the resetting of the data signal may also be used with systems that do not simultaneously transmit a data signal and a reference signal.

Controlling Effective Radiated Power

As described above, the common wave system may transmit the common wave at a fixed frequency and the signal is essentially unmodulated and the data channels with the data signals are at different frequencies and the amplitude of the data channel signals have a known relationship to the common wave signals. In one embodiment, the common wave signal amplitude may be significantly higher than the data signals, such as 0-20 dB. Then, at the receiver, a very narrow band pass filter (BPF) detects the common wave signal.

The significantly higher amplitude common wave signal establishes, at the receiver, a strong reference signal for evaluating the frequency, phase, amplitude and/or time of the data signals. The strong reference signal may be used by hardware, software, a digital signal processor (DSP), etc. to differentiate the data signal from noise and decoding/recovering the data signals.

As an example, the common wave signal may be transmitted at an effective radiated power (ERP) of 100 watts and there may be eight data channels each transmitting at an ERP of 50 W to 8 different receivers. For the common wave signal, the receiver may have a band pass filter with a bandwidth of 100 kHz so that the receiver will be receiving a strong signal that is being sampled over a 10 microsecond period. It is well known that a 100 W signal is better able to penetrate walls and weather and deal with noise, multipath and travel speeds than a 50 W signal. Therefore, each of the eight receivers will receive a strong common wave signal which will be used as a reference for evaluation the specific signal that is of interest to the specific receiver.

In most actual implementations of communication systems, there are limits on the amount of power each transmitter is allowed to transmit. For example, in general in the United States, mobile phone tower transmitters are only allowed to transmit 500 W ERP so that one cannot design an implementation of a communication system with eight 100 W data signals because the transmitter would exceed the maximum power allowed. However, an implementation that has a powerful common wave signal and a plurality of data wave signals at lesser power allow the communication system to meet the transmission maximum power levels while allowing the data signals to be more accurately decoded/recovered due to the stronger power common wave signal. The above higher power common wave signal may be broadcast to a large number of receivers that can each utilize the common wave signal so that the ratio of the common wave signal to the number of data wave signals may be 1 to 8 (the above example), 1 to 100, 1 to 1000 or 1 to 1,000,000. In fact, there is no limit to the number of data channels that can use a single common wave signal. The advantage of more data channels using the same common wave signal is that the common wave signal takes up a smaller percentage of the total allowable ERP. In one embodiment, multiple mobile phone service providers using the same cell tower could use the same common wave signal thereby allowing all of them to increase the ERP to each data channel.

Minimizing Effective Bandwidth

Figure 10:
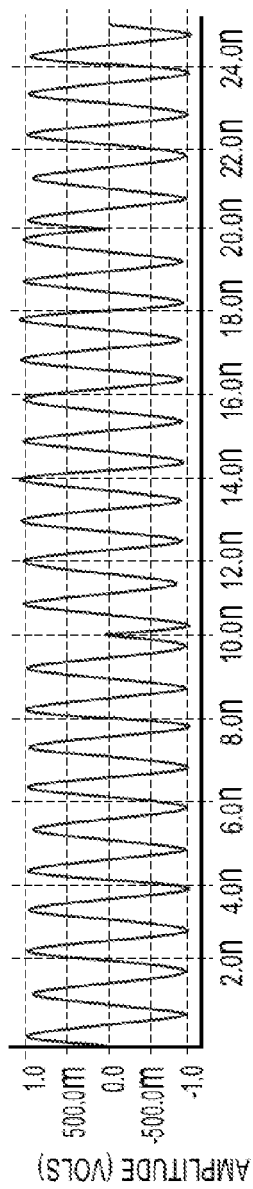
FIGS. 10 and 11 illustrate an example of a method for minimizing effective bandwidth of a communication system.
Figure 11:
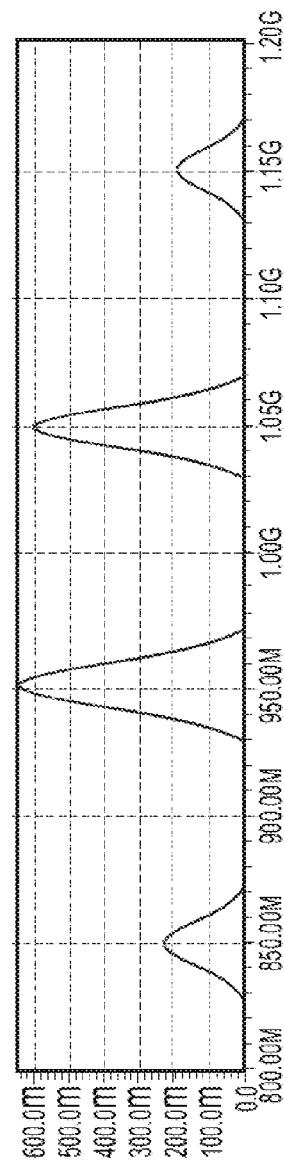

FIGS. 10 and 11 illustrate an example of a method for minimizing effective bandwidth of a communication system. The method illustrated in FIGS. 10-11 may be used with conventional communication systems as well as the common wave communication system.

In an exemplary communication system, if a carrier frequency is 1 GHz, and digital data is modulated via AM, FM or PM at 10 MHz, the frequency band that will be transmitted is from 990 MHz to 1.010 GHz which causes interference problems with 995 MHz if it needs to be used as a transmission channel. The resulting increase in bandwidth is one of many factors that limit the total amount of data that can be transmitted in a given frequency band. To overcome this interference at 995 MHz and minimize the bandwidth of the carrier wave, the communication system may use a carrier wave that is phase shifted 180 degrees at predetermined times as shown in FIG. 10. For simplicity, the information signal that is modulated onto the carrier wave is not shown. As shown in FIG. 11, this phase shifting makes the average power at the carrier frequency and the nearby channels, e.g., 995 MHz, zero. This allows 995 MHz to be used as a communications channel using the common wave system or conventional technologies and be unaffected by the 1 GHz channel.

In one embodiment, if the transmission signal is phase shifted every 10 cycles, the receiver must also be "phase shifted" to be able to handle the incoming signal. If adjacent channels also use this phase shifting approach, the timing for each channel's phase shifting can be offset from the other channels. This will enable more channels to be crammed into the same frequency band without inter-channel interference.

Figure 12:
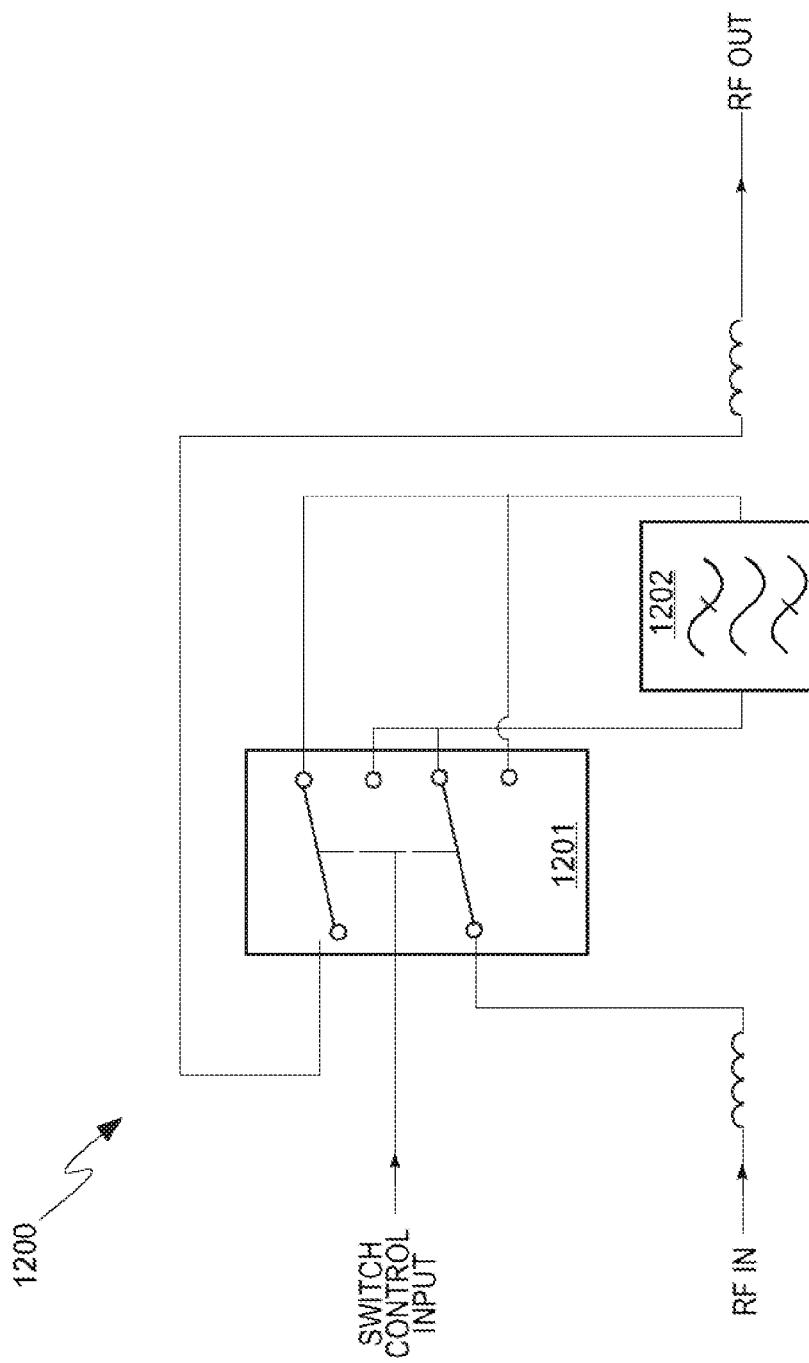
FIG. 12 illustrates an example of a filter for use with signals that have alternating phases.

In traditional filters for transmitters or receivers, alternating the phase of a signal as shown in FIG. 10 can prevent the circuit from resonating effectively and hence the circuit will output a weak signal. FIG. 12 shows an embodiment of an alternating phase signal filter 1200 which effectively reaches resonance for a signal with an alternating phase. A switch 1201 alternates positions based on the switch control input. The timing of the position switch is such that the conventional bandpass filter or resonant circuit 1202 always has the same phase input to it. This allows the circuit to achieve resonance and thus pass a strong signal at the desired frequency and phase. Also, this will cause destructive interference for frequencies and phases that are not desired. This same type alternating phase signal filter 1200 will work well with signals that have been reset as shown in FIG. 9.

In the embodiment shown in FIG. 10, the carrier wave is phase shifted 180 degrees but it can be appreciated that other combinations of phase shifting can achieve the similar results and the system is not limited to the 180 degree phase shift shown in FIG. 10. For example: 10 carrier waves at 0 degrees, 10 carrier waves at 120 degrees and 10 carrier waves at −120 degrees will have a lower average power at the carrier frequency than 30 waves at 0 degrees. Also, combinations of different phases, amplitudes and frequencies can have similar effects and are within the scope of this disclosure.

Neutralizing Sidebands

FIGS. 13 and 14 illustrate an example of a method for neutralizing sidebands of a communication system. The method illustrated in FIGS. 13-14 may be used with conventional communication systems as well as the common wave communication system. When a wireless signal is changed (amplitude, frequency and/or phase) the bandwidth is increased and sidebands are created. The sidebands are a necessary part of wireless communication in many protocols, e.g., "single sideband." In many circumstances though, sidebands are an undesirable byproduct of the signal modulation.

As shown in FIG. 11, significant sidebands are seen which are generated by the phase shifting of the carrier signal. These are undesirable because they will be radiated and cause interference with other channels at those frequencies. The traditional method of eliminating sidebands is the use of low pass, high pass or bandpass filters. These traditional filters are undesirable in a situation where high speed data signals are involved because the filters degrade the high speed signals. In the neutralizing sideband method that may be used with the common wave system, a "neutralizing signal" may be injected into the transmission line along with the carrier signal. As shown in FIG. 13, to neutralize the 950 MHz sideband, a 950 MHz signal with a specific predetermined amplitude and phase are used to neutralize that sideband and FIG. 13 shows that the resultant signal where the 950 MHz sideband is neutralized. For example, the injected signal needs to be the same amplitude and 180 degrees phase shifted from the sideband to be neutralized. In the example shown in FIG. 13, the carrier wave has an amplitude of 1 volt (see FIG. 10) and the injected 950 MHz signal has an amplitude of 0.6525 volt. The injected signal starts out of phase with the carrier wave 90 degrees. In addition, additional signals can be similarly injected to eliminate other side bands.

The injection of a signal into the transmission line can be used to eliminate sidebands created from all sources of sidebands as long as the amplitude, frequency and phase of the sideband is known in advance. These values can be determined from previous transmissions in a laboratory environment and then be used in a field setting. Even in the case of sidebands created from data modulation, an appropriate sideband neutralizing signal can be injected into the transmission line. The specifics of that neutralizing signal will be different depending on the value of the data.

At the receiver end of the transmission system, the original carrier wave is recovered using known techniques. In the case of the injected neutralizing signals, those injected neutralizing signals are removed to recover the original carrier wave.

In the context of the disclosure, "transmission line" is defined as any path used to transfer the signal energy from one location to another. This includes but is not limited to: conductors in the transmitter, waveguides, lines connecting the transmitter to the one or more antennae, amplifiers or communications links, including wireless communications links.

Now, a detailed example of the above neutralization of sidebands (sideband mitigation) is described in which simulations are used to illustrate the neutralization of sidebands. The example presented below illustrates how the neutralization of sidebands can substantially increase the spectral efficiency of wireless communication. In the example, well known signals will be shown as a starting point and then signals utilizing the described sideband mitigation will be shown for comparison. For purposes of the example, a carrier wave of 1 GHz is used although the disclosed sideband mitigation can be used with any frequency and thus is not limited to any particular frequency. This exemplary frequency is used because it is in close proximity to common frequency bands such as cellular phones (800, 900, 1800, 2100 MHz), WiFi (2.4 GHz) and WiMax (2.3, 2.5 and 3.5 GHz). For purposes of the example, the simulation software used is LTspice/SwitcherCAD III Version 2.24i produced by Linear Technology Corporation.

Figure 15:
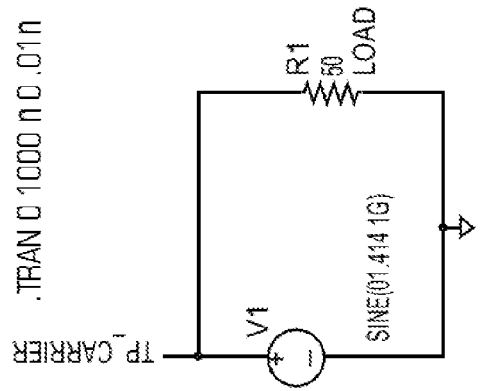
FIG. 15 illustrates an example of a circuit for generating 1 GHz carrier wave with a 1.414V amplitude & 0° phase.
Figure 16:
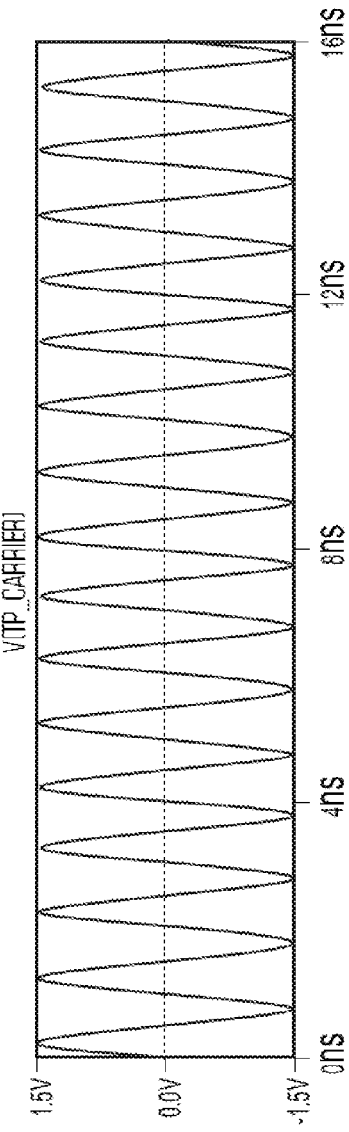
FIG. 16 illustrates an example of a time domain for the 1 GHz carrier wave unmodulated.

A circuit that can create the 1 GHz carrier wave for this example is shown in FIG. 15. The voltage source generates a sine wave with a 1.414 V amplitude and 1 GHz frequency. Simulating this circuit in the time domain provides voltage vs. time oscilloscope output as shown in FIG. 16. Performing a well known FFT (Fast Fourier Transform) simulation on the signal voltage results in FIG. 17. For purposes of this example, all FFT operations are performed for a 1000 ns time period using a Hamming windowing function, 1,048,576 data point samples, and 5 point binomial smoothing unless specified otherwise.

To demonstrate how Federal Communications Commissions (FCC) regulations are applied, let us look at CFR Title 47, Part 15—*Radio Frequency Devices, §15.247 Operation within the bands 902-928 MHz, 2400-2483.5 MHz, and 5725-5850 MHz* which provides:

§15.247 Operation within the bands 902-928 MHz, 2400-2483.5 MHz, and 5725-5850 MHz.
(a) Operation under the provisions of this Section is limited to frequency hopping and digitally modulated intentional radiators that comply with the following provisions:
(1) Frequency hopping systems shall have hopping channel carrier frequencies separated by a minimum of 25 kHz or the 20 dB bandwidth of the hopping channel, whichever is greater . . . .

The power for the carrier wave shown above is 20 mW which is below the maximum levels for those bands and 1 GHz. Zooming in on the FFT results and drawing the 250 kHz (20 dB) bandwidth mask results in FIG. 18 in which the signal does not fit within the mask because the FFT is only sampling for 1000 ns.

Figure 19:
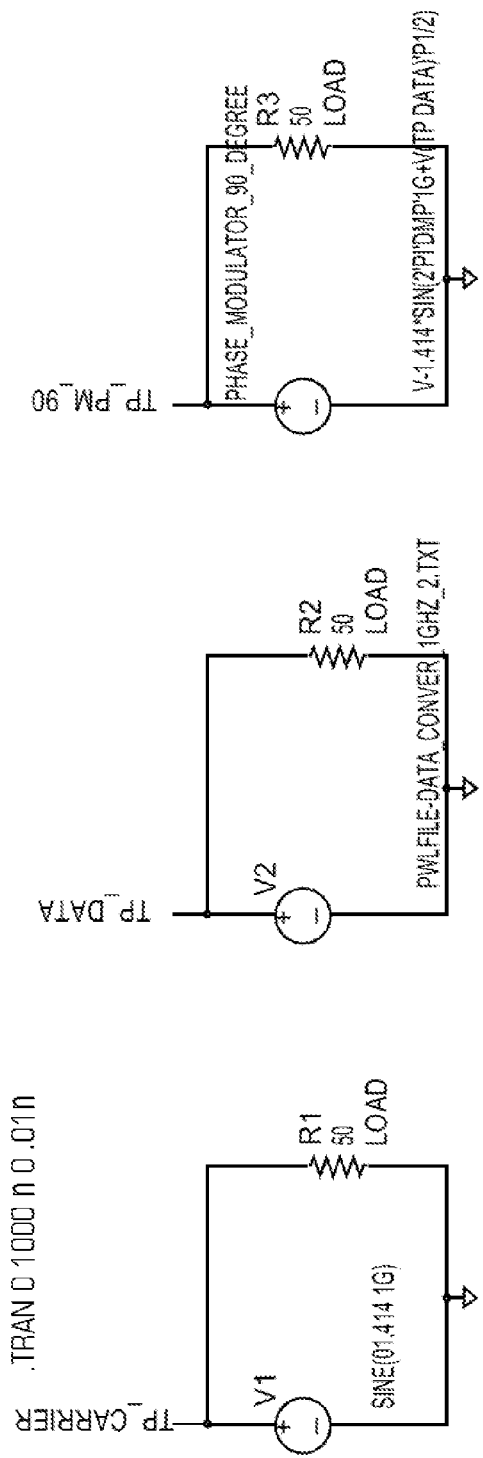
FIG. 19 illustrates an example of a circuit with data signal generated by V2 and modulation done by Phase_Modulator_90_deg.

To add data to the carrier wave, a data signal is generated by V2 and output to TP_Data in FIG. 19. The following data for the example is arbitrarily selected:

10110011 10001111 00001111 10000011 11110000 00111111 10000000
11111111 00000000 11111111 10000000 00111111 11110000 00000011
11111111 10000000

Figure 20:
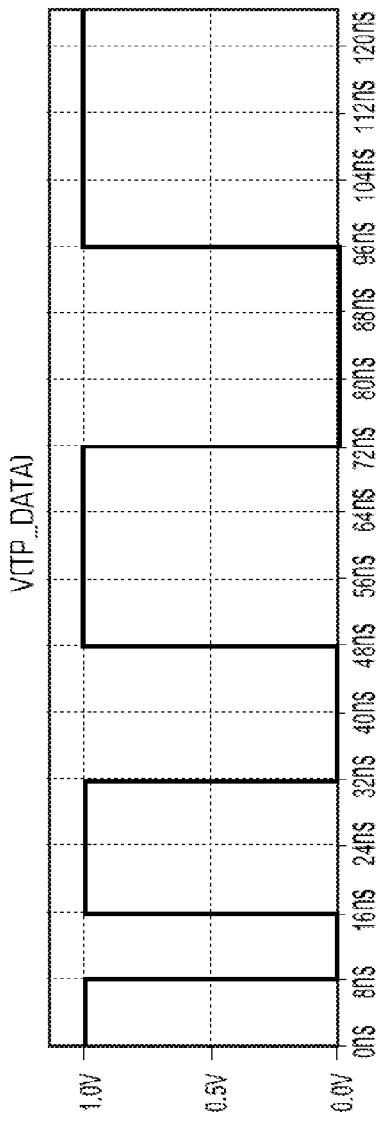
FIG. 20 illustrates an example of a data signal for the first 124 ns. Data bit period is 8 ns.

The data rate is 125 Mbps which is a period of 8 ns. The first 124 ns of the signal is seen in FIG. 20.

Figure 21:
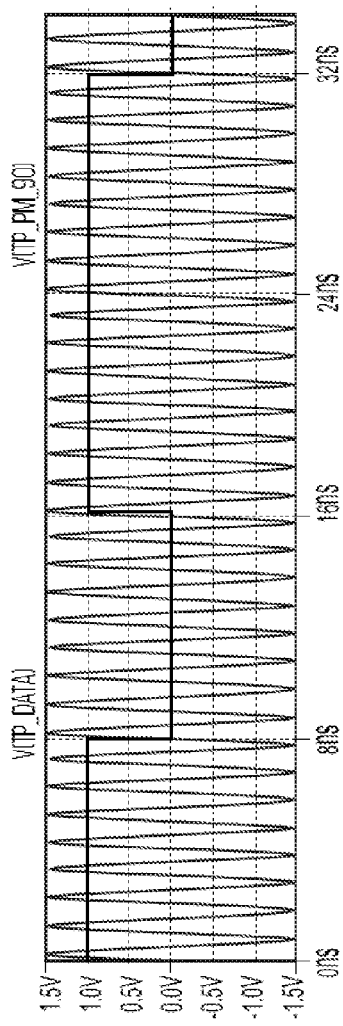
FIG. 21 illustrates an example of a modulated signal. Data bit 1 is phase 90°. Data bit 0 is phase 0°. 34 ns shown.
Figure 22:
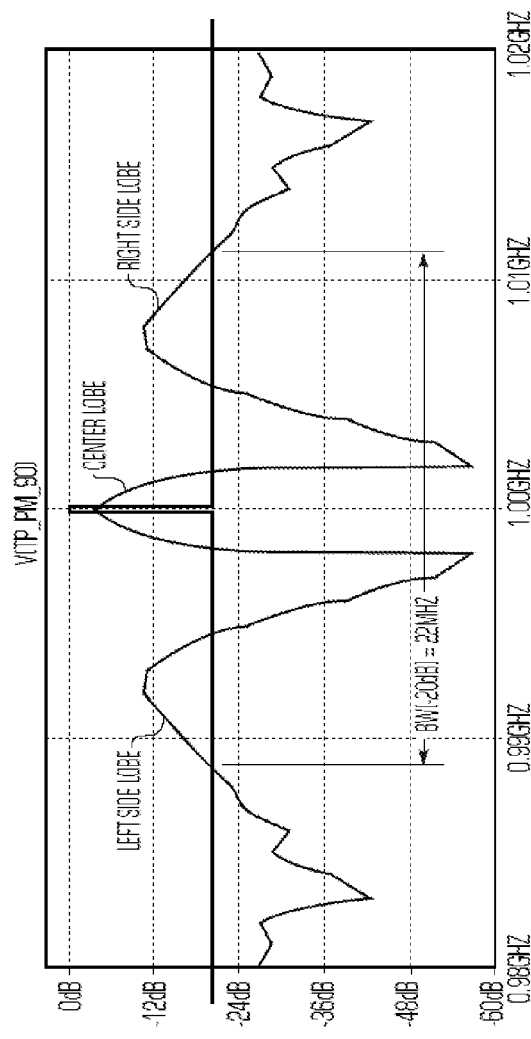
FIG. 22 illustrates an example of an FFT of the 125 Mbps, 90° phase shift, modulated signal.

The Phase_Modulator_90_degree shown in FIG. 19 modulates the carrier wave with the data wave wherein a data bit "1" is phase shifted 90° and a data bit "0" is phase shifted 0°. FIG. 21 shows the first 36 ns of the modulated signal. FIG. 22 shows the FFT of the modulated signal that has significant sidebands. As expected, the lobes do not fit within the mask because the data rate is too high. As seen, the 20 dB bandwidth is 22 MHz as shown in FIG. 22.

The sideband mitigation system disclosed herein provides increased spectral efficiency which is defined as:

(Spectral Efficiency)=(Data Rate)/(Bandwidth)    (Equation 1)

Using Equation 1, we find the spectral efficiency for the signal shown in FIG. 21 is:

$SE_{-20\ dB}$=(125 Mbps)/(22 MHz)=5.7 Mbps/MHz

Any attempt to use a bandpass filter (a typical solution) to improve the spectral efficiency of the signal of FIG. 21 will not be useful because the bandpass filter will filter out the data. However, the spectral efficiency can be improved using known techniques which include the use of: reducing the delta phase shift below 90° (e.g., 11.5°), amplitude modulation, and others. These known techniques work and are used regularly but have limitations due to real world noise and sensitivity of the hardware. For example, reducing the delta phase shift 11.5° will make the receiver more susceptible to phase noise (jitter) and approaches the limits of the resolution of phase detector. Thus, the typical solutions have limitations and/or do not provide sufficient results. The sideband mitigation technique disclosed herein improves over these known techniques and in fact can be used with these known techniques to reduce sidebands and increase spectral efficiency.

Figures 23, 24:
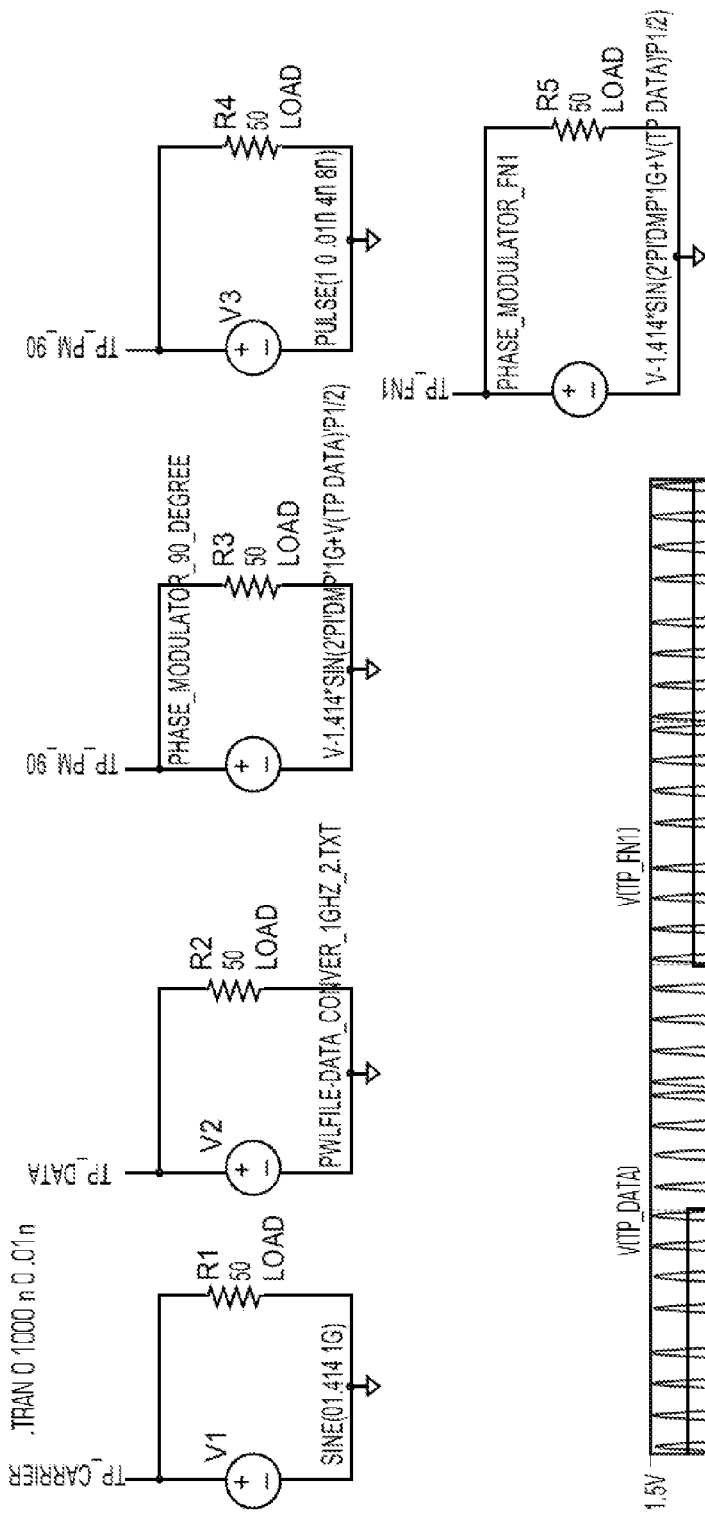
FIG. 23 illustrates an example of an implementation of a first step in Sideband Mitigation circuitry.
FIG. 24 illustrates an example of a modulated signal has data bit 1 start with phase 0 and data bit 0 start with phase 180.

To implement the disclosed sideband mitigation, the center lobe shown in FIG. 22 may be examined. As shown in FIG. 23, a 250 MHz clock may be added with output TP_CLK_250 and the a phase shift modulator with output TP_FN1. Due to the Phase Shift Modulator, each data bit is phase shift 0 for half the data period and phase shift 180 for the other half. If the data bit is a 1, it is phase 0 for the first half and phase 180 for the second half. If the data bit is a 0, it is phase 180 for the first half and phase 0 for the second half as shown in FIG. 24. In LTspice (the simulation software used in the example), "^" (shown in FIG. 23 is an operand that "Convert(s) the expressions to either side to Boolean, then XORs (exclusive ors) the result.

Figure 26:
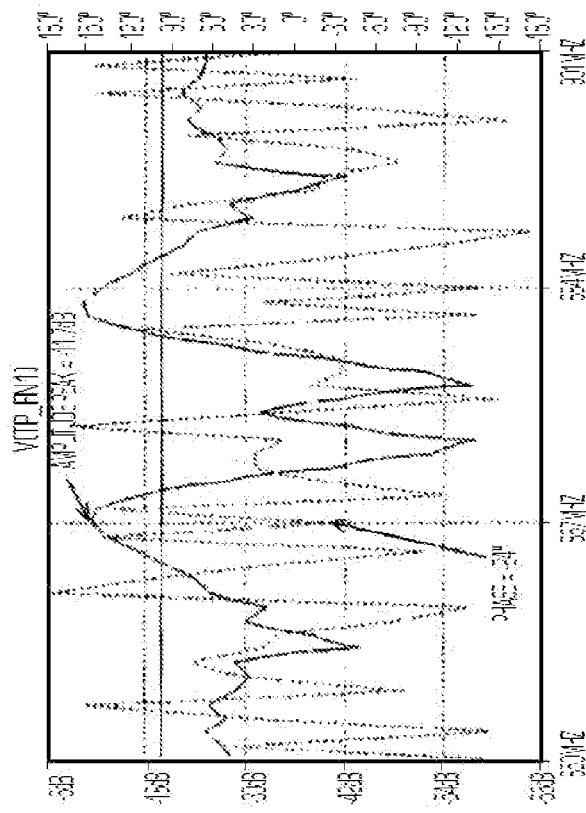
FIG. 26 illustrates the 867 MHz and 884 MHz lobes shown with phase.
Figure 25:
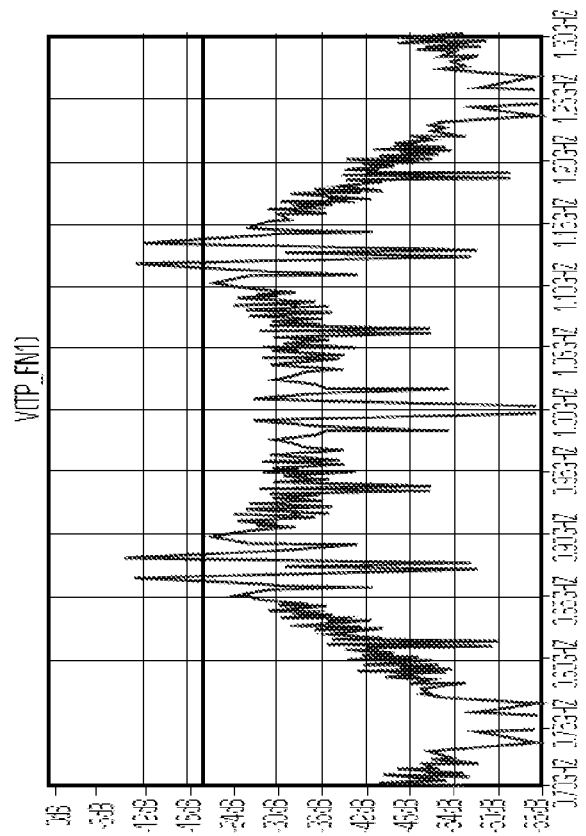
FIG. 25 illustrates an example of an FFT with 1 GHz lobe removed. Sidebands are worse.
Figure 27:
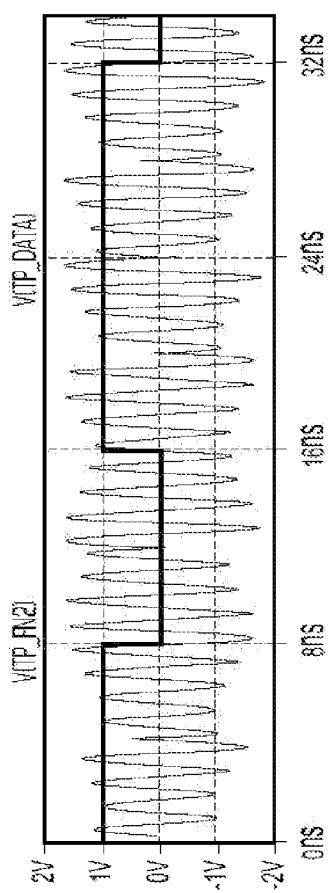
FIG. 27 illustrates an example of an implementation of a Sideband Mitigating signal added to reduce a 867 MHz lobe.

The modulation of the sideband mitigation technique causes each data bit to cancel itself out on the FFT which results in the 1 GHz lobe being eliminated as seen in FIG. 25, but the other lobes in FIG. 22 are worse than before. Zooming in on 867 MHz in FIG. 25 and adding phase gives FIG. 26 in which the lobe is centered at 867 MHz, the peak is at −11.7 dB and the phase is −24° (and 1 GHz is at −7°.) To mitigate the 867 MHz lobe, we add a 867 MHz, 0.368 V amplitude, 245° phase sine wave, V(TP_FN2) to the signal. The results are TP_FN2 and shown in FIGS. 27 and 28.

Figure 28:
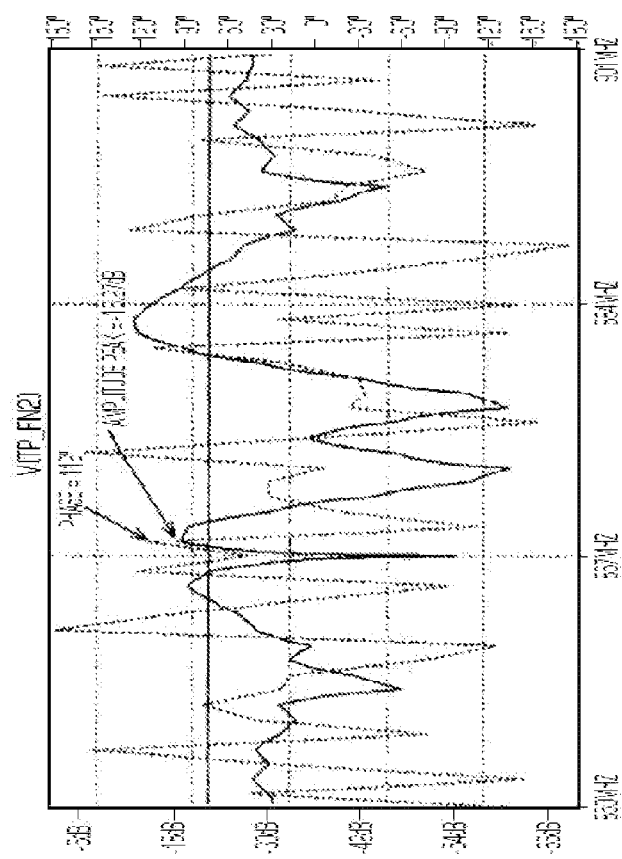
FIG. 28 illustrates an example of a 867 MHz lobe minimized but residual lobes remain.
Figure 29:
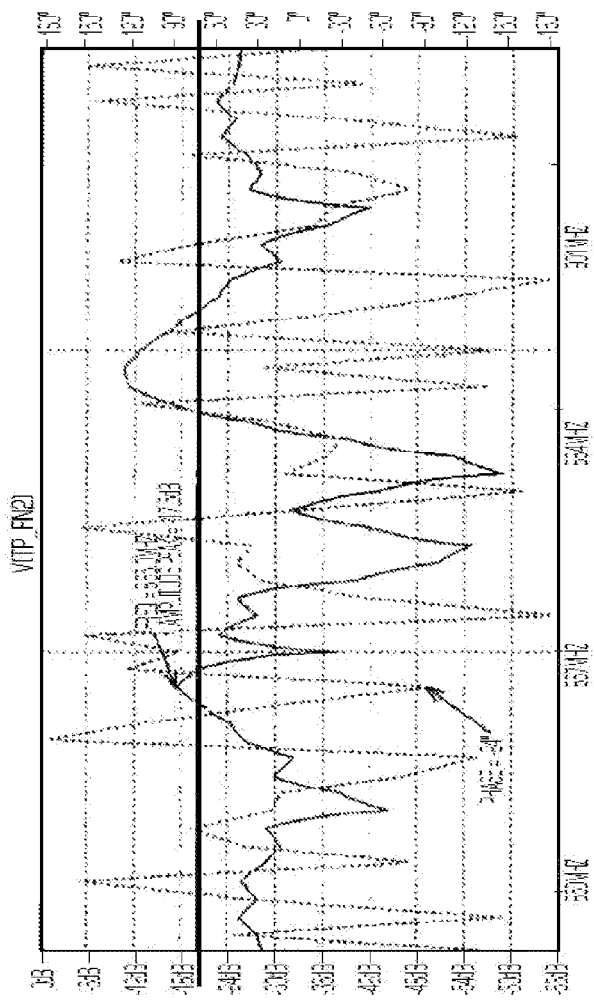
FIG. 29 illustrates an example of an implementation of a 868 MHz residual lobe that has been mitigated.

FIG. 28 shows residual lobes remain from the first mitigation attempt. To mitigate the 868 MHz lobe, add a 868.6 MHz lobe w/0.200 amplitude and 250° phase. These results are shown in FIG. 29. These steps can be repeated for elimination of all the lobes above the −20 dB mask thereby enabling a 125 Mbps data rate to fit within a 250 kHz bandwidth FCC allocation. Using this number in Equation 1, the spectral efficiency of the sideband mitigation system is:

$$SE_{-20\ dB} = (125\ Mbps)/(250\ kHz) = 500\ Mbps/MHz$$

Figure 30:
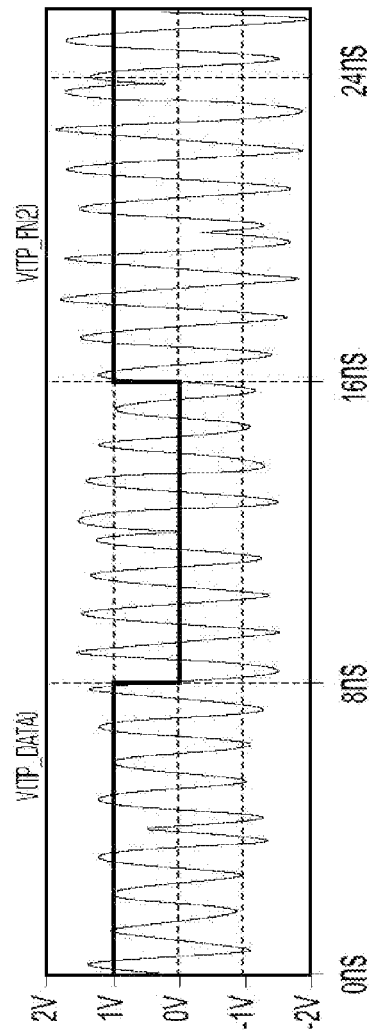
FIG. 30 illustrates an example of an implementation of a signal with all the sidebands below 1 GHz mitigated.
Figure 31:
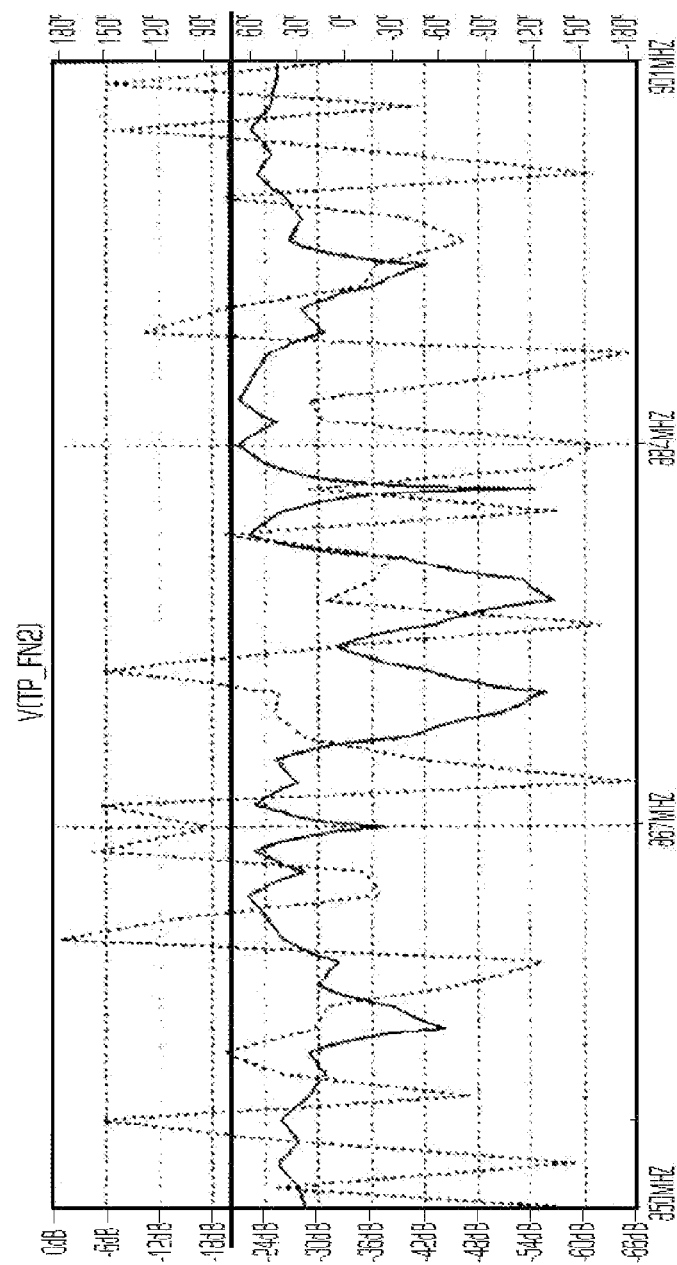
FIG. 31 illustrates an example of an implementation of an FFT with sidebands below 1 GHz mitigated with Sideband Mitigation signals shown in Table 1.

That is substantially higher the spectral efficiencies of existing technologies. It could be stated that actual spectral efficiency per the standard equation is infinity. The elimination of all the lobes below 1 GHz is achieved with the SBM signals shown in Table 1 below and the resultant signal is shown in FIG. 30 and the FFT shown in FIG. 31.

TABLE 1

| Frequency (MHz) | Amplitude (dB) | Amplitude (V) | Phase (degrees) | Phase (radians) |
|---|---|---|---|---|
| 867 | −11.7 | 0.368 | 244 | 4.259 |
| 868.5 | −17.0 | 0.200 | 250 | 4.363 |
| 865 | −17.5 | 0.188 | 162 | 2.827 |
| 883 | −10.7 | 0.413 | 294.5 | 5.140 |
| 881 | −16.6 | 0.209 | 22.39 | 0.391 |
| 882 | −17.4 | 0.191 | 137 | 2.391 |
| 885 | −16.22 | 0.218 | 22 | 0.384 |

The appropriate characteristics of the neutralizing signal can be determined by a formula in which the data to be transmitted is input into the formula or by a lookup table in which the data to be transmitted is used.

Phase Filtering

If information signal in the data wave is phase modulated, phase filtering is useful in the receiver for demodulation Phase modulation is particularly valuable for incoming signals that have noise and interference from nearby data channels. In one example, it is assumed that the incoming signal has the desired data in the signal but the data portion of the signal is obscured by noise and interference in the signal. To perform the phase filtering, an assumption of the value (e.g., a 1 or a 0) of the data is made and a signal equivalent to that assumption is injected into the incoming signal. If the assumption of the data value is correct, constructive interference between the incoming signal and the injected signal will provide constructive interference and verify the assumption. If the assumption of the data value is wrong, destructive interference will show the assumption to be wrong. If the incoming signal and the injected signal are in a resonant (or "tuned") circuit, the difference in the output signal between a correct and incorrect assumption will be quite substantial. This is because the correct assumption on the injected signal and the incoming data portion of the data signal will increase the output signal's amplitude every wave.

In one embodiment 1500 shown in FIG. 32, the incoming signal may be split 1505 into 2 circuits wherein one circuit 1501 assumes that the data is a "1" and the other circuit 1502 assumes the data is a "0". The signal generators 1503 and 1504 generate signals equivalent to their respective assumption of 1 and 0 respectively. Resistors 1506 are used to add the input signal to the simulated signals. If all four of the resistors shown are the same value, the signals will all be added evenly. If gain is required for specific signals, the resistors of different values can be used. The output from these two circuits may be run through a signal comparison device 1507 and the output of the signal comparison device provides a signal with a strong indication of which assumption ("0" or "1") is the correct assumption. While this output signal will be significantly different than normal wireless signals to be demodulated, it can be analyzed with well known techniques using standard circuitry or digital signal processors (DSP).

It should be noted that while hardware circuits are shown throughout this disclosure to illustrate how specific signals can be generated, these signals and the functions of the hardware can be synthesized through a variety of means which include but are not limited to: digital signal synthesis, waveform generator, arbitrary waveform generator, signal generator, function generator, digital pattern generator, frequency generator, frequency synthesis, direct digital synthesis, etc. For the purpose of this disclosure, all these terms and various hardware solutions are all synonymous and are to be within the scope of this disclosure.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A communications apparatus, comprising:
    a transmitter that is capable of transmitting a channel across a transmission line;
    a carrier wave source that provides a carrier wave having a frequency to the transmitter; and
    a circuit that changes a characteristic of the carrier wave to cause a substantial reduction in the average power at the frequency of the carrier wave;
    wherein the circuit that changes a characteristic of the carrier wave further comprises a neutralizing signal generator that injects a neutralizing signal having a characteristic into the transmission line that neutralizes one or more sidebands at one or more sideband frequencies of the carrier wave wherein the neutralizing signal destructively interferes with the one or more sidebands at one or more sideband frequencies.

2. The apparatus of claim 1, wherein the characteristic of the carrier wave further comprises a phase of the carrier wave and wherein the circuit that changes a characteristic of the carrier wave further comprises a circuit that shifts the phase of the carrier wave in such a manner that there is a substantial reduction in the average power at the carrier frequency.

3. The apparatus of claim 1, wherein the characteristic of the neutralizing signal is determined by a formula in which the data to be transmitted is input into the formula.

4. The apparatus of claim 1, wherein the characteristic of the neutralizing signal is determined by a lookup table in which the data to be transmitted is used.

5. The apparatus of claim 1, wherein the characteristic of the carrier wave is selected from a group consisting of a phase of the carrier wave, an amplitude of the carrier wave and a frequency of the carrier wave.

6. The apparatus of claim 1, wherein the circuit that changes the characteristic of the carrier wave further comprises a modulator.

7. A communications method, comprising:
    providing a carrier wave having a frequency;
    electronically changing a characteristic of the carrier wave to cause a substantial reduction in the average power at the frequency of the carrier wave; and
    injecting a neutralizing signal having a characteristic into the transmission line that neutralizes one or more sidebands at one or more sideband frequencies of the carrier wave wherein the neutralizing signal destructively interferes with the one or more sidebands at one or more sideband frequencies.

8. The method of claim 7, wherein changing the characteristic of the carrier wave further comprises shifting the phase of the carrier wave in such a manner that there is a substantial reduction in the average power at the carrier frequency.

9. A communications apparatus, comprising:
a transmitter that is capable of transmitting data across a transmission line using a generated signal; and
a circuit that adjusts the generated signal to minimize bandwidth of the signal; and
a neutralizing signal generator that injects a neutralizing signal having a characteristic into the transmission line that neutralizes one or more sidebands at one or more sideband frequencies of the carrier wave wherein the neutralizing signal destructively interferes with the one or more sidebands at one or more sideband frequencies.

10. The apparatus of claim 9, wherein the circuit adjusts the signal for one or more of a given carrier wave frequency, a data set, a data modulation method, a data rate, an amplitude and a phase.

11. The apparatus of claim 9, wherein the circuit generates a signal that is out of phase with the signal to adjust the signal.

12. The apparatus of claim 9, wherein the circuit generates a signal that is out of phase with the sidebands of the signal to neutralize the sidebands.

13. The apparatus of claim 9, wherein the timing of the phase shifting of the signal prevents it from interfering with other channels.

14. The apparatus of claim 9, wherein the transmitter further comprises a lookup table that is used in the creation of the generated signal.

* * * * *